E. S. JONES.
DIRIGIBLE PARACHUTE.
APPLICATION FILED JUNE 1, 1918.
1,278,158.
Patented Sept. 10, 1918.
2 SHEETS—SHEET 1.
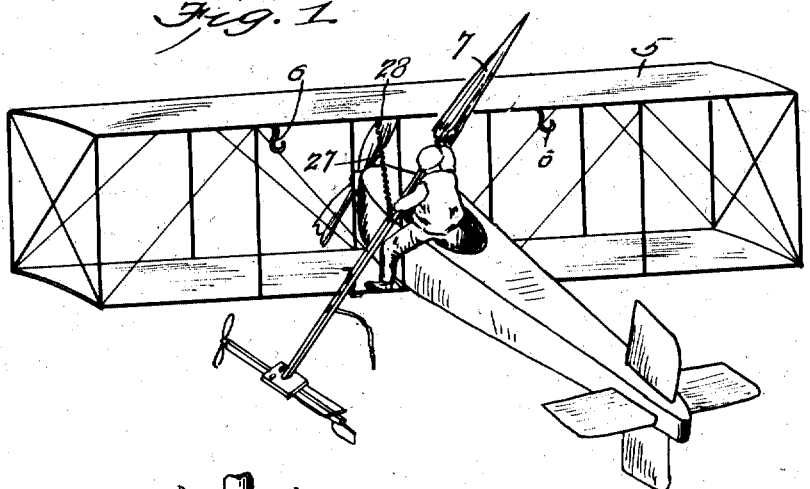
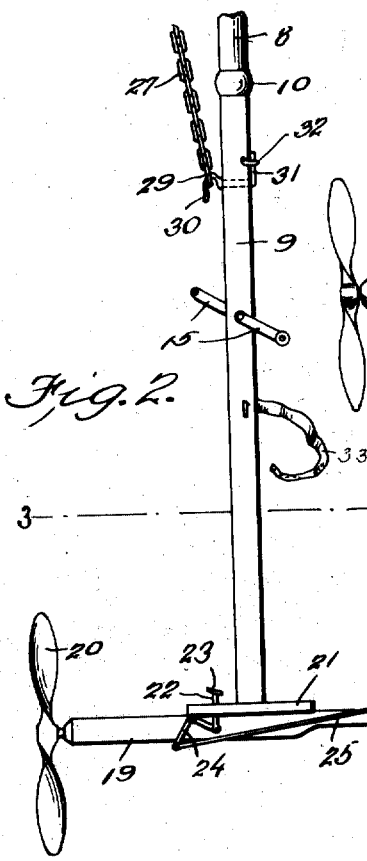
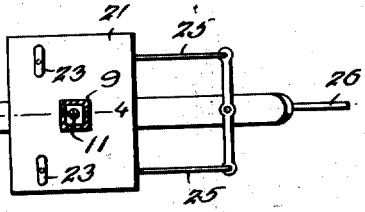
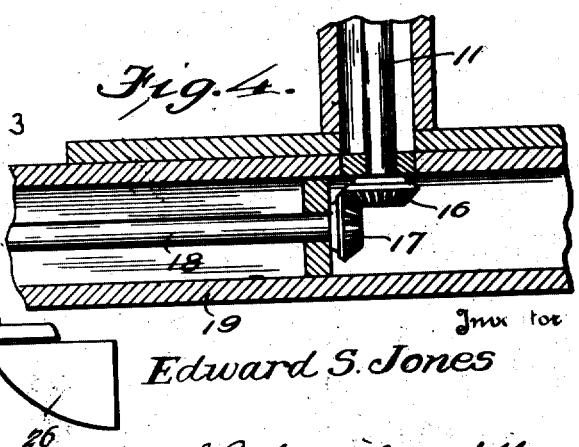
Inventor
Edward S. Jones
By Stephen...
Attorney

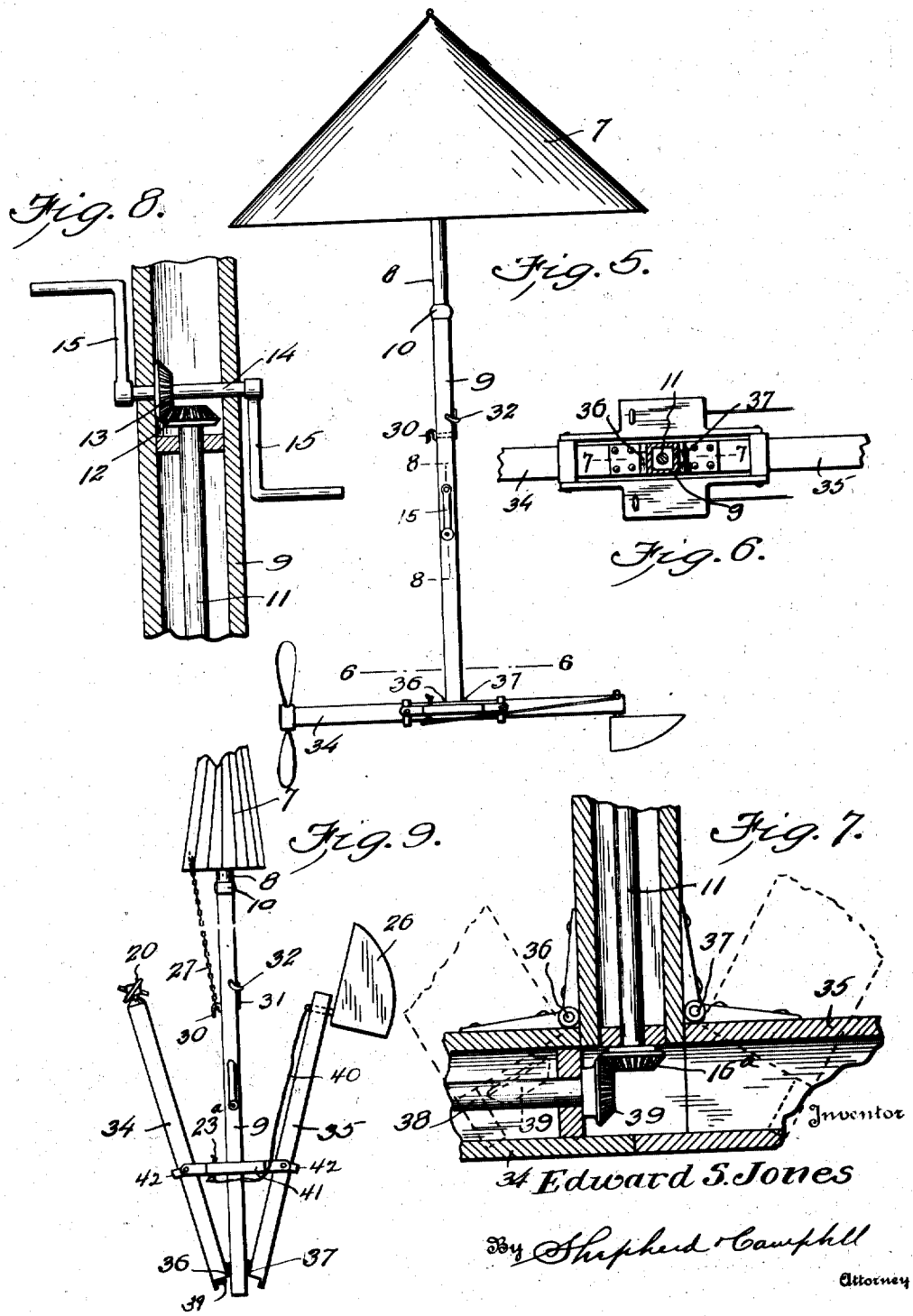

UNITED STATES PATENT OFFICE.

EDWARD S. JONES, OF MOBILE, ALABAMA, ASSIGNOR OF ONE-HALF TO NICHOLAS TATE JONES, OF MOBILE, ALABAMA.

DIRIGIBLE PARACHUTE.

1,278,158.  Specification of Letters Patent.  Patented Sept. 10, 1918.

Application filed June 1, 1918. Serial No. 237,762.

*To all whom it may concern:*

Be it known that I, EDWARD S. JONES, a citizen of the United States, residing at Mobile, in the county of Mobile and State of Alabama, have invented certain new and useful Improvements in Dirigible Parachutes, of which the following is a specification.

This invention relates to dirigible parachutes, its general object being to provide a parachute to which forward motion may be imparted under control of the person using the same, to thereby render it possible for aviators to select their landing place when using the parachute, instead of being subject to the dangers that arise from the uncontrolled descent of devices of this nature.

In attainment of the aforesaid object I provide a parachute of such a nature that it may be easily carried upon the airplane, will be held securely in proper position with respect to the said airplane during the time that the aviator is taking his position thereon, will be easily and quickly releasable after the aviator has firmly secured his footing and hold thereon, will be capable of propulsion under control of the operator and will be capable of being steered by the operator so that a forward movement may be imparted to the parachute during its descent with the result that the aviator may avoid falling into trees, wires or in any other obstructions likely to prove dangerous to life or limb and whereby, when the airplane is being used for military purposes the aviator may cause the parachute to descend behind his own lines rather than behind the lines of the enemy.

Further advantages of this invention will be set forth in the detailed description which now follows.

Figure 1 is a perspective view of an airplane showing the aviator about to leave said plane and take his position upon the parachute.

Fig. 2 is a side elevation of the lower portion of the parachute upon an enlarged scale.

Fig. 3 is a horizontal section on line 3—3 of Fig. 2.

Fig. 4 is an enlarged sectional view of the driving connection to the propeller.

Fig. 5 is a view of a modified form of parachute in which the propeller carrying and the rudder carrying portion of the parachute are foldable with respect to the vertical standard of the parachute.

Fig 6 is a horizontal section upon line 6—6 of Fig. 5.

Fig. 7 is a vertical section illustrating the driving connection at the lower part of the parachute shown in Fig. 5.

Fig. 8 is a vertical, sectional view, illustrating the operating handles and driving connections through which the propeller is manually operated by the aviator and Fig. 9 is a detail view illustrating the parts in a properly folded condition.

Referring to the drawing 5, designates an airplane of conventional construction and at any suitable point upon the airplane I provide space hooks 6, in which the parachute may lie, in a substantially horizontal position. This parachute carries a canopy or top 7, adapted to open after the manner of an umbrella and this canopy is carried by a vertical standard comprising an upper part 8, and a lower part 9, the two being connected by the ball bearing or swivel joint 10. This permits the lower part to turn with relation to the upper part and thus the steering may be effected without the pedals hereinafter described.

The part 9, of the standard is hollow and carries a vertical shaft 11, that is provided with a bevel gear 12, at its upper end. This bevel gear meshes with a corresponding gear 13, upon a transverse shaft 14, having operating handles 15, at the opposite ends thereof, said handles being preferably spaced 180 degrees apart.

A gear wheel 16, mounted upon the lower end of the shaft 11, meshes with a gear 17, that is mounted upon a shaft 18. The shaft 18, is disposed horizontally in the base 19, and said shaft carries a propeller 20 at its forward end. Any desired ratio between the gears 16 and 17 may be employed to secure any desired speed of the propeller.

A platform 21, is carried by the base 19, and provides a rest and support for the feet of the user. Pedals 22, project through openings 23, in the platform 21, and lie in position to be engaged by the feet of the operator, said pedals being adapted, through bell crank levers 24, and connecting rods 25, to operate a rudder 26.

It is apparent that if a person standing upon the platform 21, operates the handles 15, rotation will be imparted to the propeller 20, to thereby propel the parachute through the air during its descent, and that the direction of the movement thus imparted to the parachute may be determined and directed by the manipulation of the rudder or vane 26.

A chain, cable or other flexible member 27, is connected to the airplane at 28, and carries at its lower end a ring 29, adapted to hook over a hook 30, that is mounted to turn in the standard 9. This hook is provided with an operating handle 31, and the standard 9, is provided with a latch 32, to lie in the path of and prevent accidental movement of the handle 31, until the aviator has secured a firm footing upon the platform 21, and has properly adjusted holding straps 33, which pass about the operator and around the standard 9, but leave the hands of the aviator free to manipulate the handle 15.

In the form of the invention illustrated in Figs. 5 to 9, the upper part of the parachute is substantially the same as that hereinbefore described and the same reference characters have been applied. However in this form of the invention the lower part of the parachute is made of two hollow sections 34, and 35, that are hinged to the lower part of the standard 9, by hinges 36, and 37. The hollow portion 34, carries a shaft 38, that is provided with a gear wheel 39. Said gear wheel meshes with a gear wheel 16ª, that corresponds with the gear wheel 16, in the form of the device illustrated in Fig. 4. The forward end of the shaft 38, carries a propeller 20ª, that corresponds to the propeller 20 in Figs. 1, and 2.

The section 35, carries a rudder 26ª, by which the parachute may be steered and this rudder is connected by cables 40 with pedals 23ª. These pedals are carried by foot rests 41, said foot-rests being connected to yokes 42, which yokes embrace the sections 34, and 35. When the foot-rests and yokes are drawn upwardly to the position illustrated in Fig. 9, the sections 34, and 35, are folded with respect to the standard 9. When the weight of the operator is brought upon the foot-rests 41, the yokes act to swing the sections to the position illustrated in Fig. 7, or in other words, to a position where they lie in horizontal alinement with each other.

Under modern aerial combat conditions it is frequently the case that air planes are set on fire. Under such conditions the aviator must either quickly leave the blazing airplane by means of a parachute, or fall with the machine, to the earth, as the sustaining planes are consumed.

The present invention renders it possible for the aviator to quickly position himself upon the parachute, release the same and fall free of the burning plane, and, by means of the propelling and steering mechanism, herein shown and described, return to his own lines in many instances, and avoid falling upon dangerous obstructions, in other instances.

Furthermore the construction shown and described renders it possible for an aviator to free himself from the danger of being overtaken and crushed by the falling airplane, because with the sustaining planes of the latter consumed the descent of the airplane is substantially vertical. Consequently the provision of means to enable the aviator to make a forward or lateral progress will carry him out of the path of the falling plane. Two or more of the parachutes may be carried when desired.

While the elements shown and described are well adapted to serve the purposes for which they are intended it is to be understood that the invention is not limited to the precise construction set forth but that it includes within its purview any means whereby a parachute may be manually propelled by, and steered under the control of the user. It is also to be understood that the parachute is not limited to use with airplanes but is valuable for use with any airship or balloon of any type whatsoever.

Having described my invention what I claim is:

1. The combination with an airship, carrying a pair of spaced supporting elements, of a parachute comprising a foldable canopy, a rigid stem, a foot-rest at the lower end of the stem, and a propelling means, the whole adapted to lie in said supporting elements, and a flexible connecting element between the standard and the airship and connected with the standard and airship at such point that when the parachute is released from the supporting elements the standard will swing to substantially vertical position, to thereby permit the operator to secure a footing upon the footrest while the parachute is supported by the connecting element.

2. A parachute comprising a standard made in two parts rotatable with respect to each other, a canopy carried by the upper of said parts and a propelling and steering means carried by the lower of said parts.

3. A parachute comprising a vertical standard, a canopy carried thereby, a base, manually operable propelling means the actuating members of which are carried by the standard, a rudder carried by the base and foot operated means for controlling the rudder, located upon the base.

4. A parachute of the character described comprising a vertical standard, a canopy carried thereby, a substantially horizontal base, a propeller at one end of the base, a rudder at the opposite end of the base, operating handles carried by the standard and connections between said handles and the propeller.

5. A structure as recited in claim 4, wherein said connections comprise a vertical shaft disposed within the standard a horizontal shaft disposed within the base and bevel gear wheels connecting said shafts.

6. A parachute of the character described comprising a vertical standard, a canopy carried thereby, a base made in foldable sections, hinged to the lower end of said standard, a propeller carried by one of the sections and a rudder carried by the other of the sections.

7. A structure as recited in claim 6, comprising foot-rests and yokes carried by the foot-rests and embracing the sections for controlling the movement of the same.

8. A structure as recited in claim 7, comprising connections carried by said foot-rests and connected with the rudder for actuating the same.

9. A parachute of the character described comprising a vertical standard made in two sections, rotatable with respect to each other, a foldable canopy carried by the uppermost of said sections operating handles carried by the lower of said sections, a substantially horizontal base made of foldable sections hinged to the lower end of the standard, a propeller carried by one of said sections, a rudder carried by the other of said sections and driving connections between the propeller and the operating handles.

In testimony whereof I affix my signature.

EDWARD S. JONES.

Witnesses:
W. P. ROBERTS,
MARGARET H. JONES.